United States Patent [19]

Ichiyanagi et al.

[11] Patent Number: 4,759,711

[45] Date of Patent: Jul. 26, 1988

[54] CALCINATION APPARATUS FOR USE IN FLUIDIZED-BED BURNING INSTALLATION FOR POWDERY RAW MATERIAL

[75] Inventors: Toshikazu Ichiyanagi, Kumagaya; Kanzaburo Suto, Saitama; Tamotsu Negishi; Yasuo Komatsu, both of Kumagaya; Shoji Sekine, Niiza; Hiroshi Teshigawara, Koshigaya; Satoru Higuchi, Tokorozawa; Masaharu Kikuchi; Hiroshi Yokomizo, both of Yokohama, all of Japan

[73] Assignees: Chichibu Cement Kabushiki Kaisha; Chichibu Engineering Kabushiki Kaisha; Ishikawajima-Harima Jukogyo Kabushiki Kaisha, all of Japan

[21] Appl. No.: 147,050

[22] Filed: Jan. 22, 1988

Related U.S. Application Data

[63] Continuation of Ser. No. 929,626, Nov. 12, 1986, abandoned.

[30] Foreign Application Priority Data

Nov. 13, 1985 [JP] Japan ................................ 60-252946

[51] Int. Cl.⁴ .......................... F27B 15/00; F27B 7/02

[52] U.S. Cl. .................................... 432/58; 432/106; 110/245

[58] Field of Search ................... 110/245; 432/58, 106

[56] References Cited

U.S. PATENT DOCUMENTS

| | | | |
|---|---|---|---|
| 3,364,589 | 1/1968 | Muller | 432/58 |
| 3,869,248 | 3/1975 | Hirai et al. | 432/106 |
| 3,904,353 | 9/1975 | Bosshard et al. | 432/106 |
| 4,014,641 | 3/1977 | Shigeyoshi et al. | 432/106 |
| 4,020,564 | 5/1977 | Bayliss | 432/58 |
| 4,169,701 | 10/1979 | Katayama et al. | 432/58 |
| 4,480,392 | 11/1984 | Tuthi | 432/58 |
| 4,573,908 | 3/1986 | Ichiyanagai et al. | 432/58 |
| 4,645,452 | 2/1987 | Henin et al. | 110/245 |
| 4,708,067 | 11/1987 | Narisoko et al. | 110/245 |

FOREIGN PATENT DOCUMENTS 44-18749  8/1969  Japan .

Primary Examiner—Henry C. Yuen

[57] ABSTRACT

Upper and lower vortex chambers are disposed immediately below a calcining furnace for calcining powdery raw materials. The scattering clinker particles from a fluidized-bed burning furnace are trapped in the lower vortex chamber and are returned to the fluidized-bed burning furnace so that the scattering clinker particles are positively prevented from flowing into the upper vortex chamber and the calcining furnace.

4 Claims, 2 Drawing Sheets

CALCINATION APPARATUS FOR USE IN FLUIDIZED-BED BURNING INSTALLATION FOR POWDERY RAW MATERIAL

This application is a continuation of application Ser. No. 929,626 filed Nov. 12, 1986 now abandoned.

BACKGROUND OF THE INVENTION

The present invention relates to a calcination apparatus for use in a fluidized-bed burning installation for powdery raw materials and more particularly a calcination apparatus used in an installation in which powdery raw materials for cement or alumina are burned in a fluidized-bed burning furnace.

A conventional fluidized-bed burning installation for cement has a construction as shown in FIG. 3 in which reference numeral 1 designates means for supplying cement powdery raw materials; 2, a main exhaust fan; 3, a first cyclone of a suspension preheater; 4, a second cyclone thereof; 5, a third cyclone thereof; 6, a fourth or lowermost cyclone thereof; 7, a calcining furnace; 8, a burner; 9, a vortex chamber which is disposed immediately below the calcining furnace 7 and supplies the swirling secondary burning air to the furnace 7; 10, a burner; 11, a fluidized-bed burning furnace; 12, a burner; 13, a riser duct for supplying high-temperature exhaust gas (1300°–1350° C.) from the fluidized-bed burning furnace 11 into the vortex chamber 9; 14, a chute for supplying the preheated raw materials to the calcining furnace 7 and riser duct 13; 15, a horizontal duct for connecting the calcining furnace 7 with the lowermost cyclone 6; 16, a chute for supplying the calcined powdery raw materials from the lowermost cyclone 6 to the fluidized-bed burning furnace 11; 17, a classifier for classifying cement clinker burned in the fluidized-bed burning furnace 11; 18, a primary cooler for air cooling the high-temperature cement clinker; 19, a secondary cooler; and 20, a duct for supplying the secondary combustion air required in the calcining furnace 7 from the secondary cooler 19 to the vortex chamber 9. The solid-line arrows indicate the flows of the air and gas while the broken-line arrows indicate the flows of the powdery raw materials and clinker.

The powdery raw materials are preheated by exhaust gas as they flow through the cyclones 3, 4 and 5 and ducts therebetween. The preheated powdery raw materials from the cyclone 5 pass through the chute 14 into the calcining furnace 7 and riser duct 13. Thereafter they are calcined in the calcining furnace 7 and flow through the horizontal duct 15 into the lowermost cyclone 6 and then are charged through the chute 16 into the fluidized-bed burning furnace 11 where they are burned into cement clinker.

When hydraulic modulus of cement raw materials expressed by

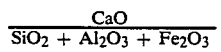

$$\frac{CaO}{SiO_2 + Al_2O_3 + Fe_2O_3}$$

increases in excess of 2.2, growth of clinker particles in the fluidized-bed burning furnace 11 is stopped unless temperature in the furnace 11 is increased as high as 1350° C. Clinker particles whose growth is stopped scatter and are entrained in the flowing exhaust gas as to circulate through the fluidized-bed burning furnace 11, the riser duct 13, the vortex chamber 9, the calcining furnace 7, the horizontal duct 15, the lowermost cyl-cone 6, the chute 16 and again the fluidized-bed burning furnace 11. As a result, the low-temperature clinker particles are returned to the fluidized-bed burning furnace 11 and the temperature in the fluidized-bed burning furnace 11 cannot be raised as high 1350° C. and consequently there arises a problem that the cement production capacity is adversely affected.

When the clinker particles less than two millimeters in particle size are entrained in the flowing exhaust gas from the fluidized-bed burning furnace 11, pass through a freeboard in the fluidized-bed burning furnace 11 and then flow into the riser duct 13 through which the gas flows at a high velocity (about 25 meters per second), they cannot drop into the fluidized-bed burning furnace 11, but flow upward into the calcining furnace 7. They cannot however flow through the inner low-velocity portion (about four meters per second) in the calcining furnace 7 and they stay in the calcining furnace 7, forming a spouted bed. As a result, draft variations occur so that there arises a problem that balance of the system is worsened because the draft variations adversely affect dust collection efficiency (that is, efficiency for separating the powdery raw materials from the exhaust gas) of the cylcones 3, 4 and 5 of the upstream suspension preheater.

Futhermore, in order to maintain calcination degree at about 85% without clogging trouble, the gas temperature at the exit of the lowermost cyclone 6 must be maintained at a set value of 860° C. However, in the conventional calcining furnace 7, the spouted bed suppresses the whirling effect of the secondary combustion air charged into the vortex chamber 9 so that the powdery raw materials charged into the calcining furnace 7 are not sufficiently swirled and the short pass results, causing decrease of retension time of the raw materials in the calcining furnace 7, and also the combustion efficiency of the burners 8 and 10 is adversely affected. As a consequence, the calcination efficiency cannot be kept properly. In order to attain the calcination degree of 85%, the gas temperature at the exit of the lowermost cyclone 6 must be maintained at about 870° C. Then the gas temperature at the exit of the third cyclone 5 increases as high as about 790° C. so that there arises a problem that the powdery raw materials become viscous, causing clogging of the third cyclone 5.

The present invention was made to overcome the above and other problems encountered in the prior art and has for its object to provide a calcination apparatus for use in a fluidized-bed burning installation for powdery materials in which calcination efficiency is improved in a calcining furnace; dust collection efficiency of the cylcones in the suspension preheater is improved, thus attaining energy savings; and pulsation in the calcining furnace is minimized to maintain a high degree of balance of the whole system.

The above and other objects, effects, features and advantages of the present invention will become more apparent from the following description of a preferred embodiment thereof taken in conjunction with the accompanying drawings.

BRIEF DESCRIPTION OF THE DRAWINGS

Same reference numerals are used to designate similar part throughout the figures.

DETAILED DESCRIPTION OF THE PREFERRED EMBODIMENT

Figure 1:
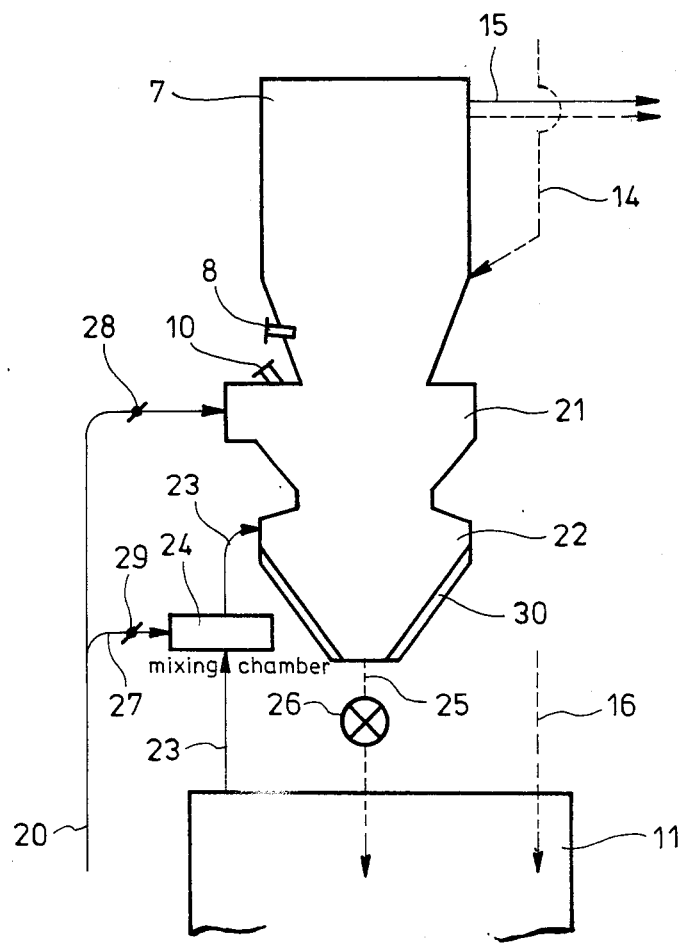
FIG. 1 is an elevational view of a preferred embodiment of the present invention.
Figure 2:
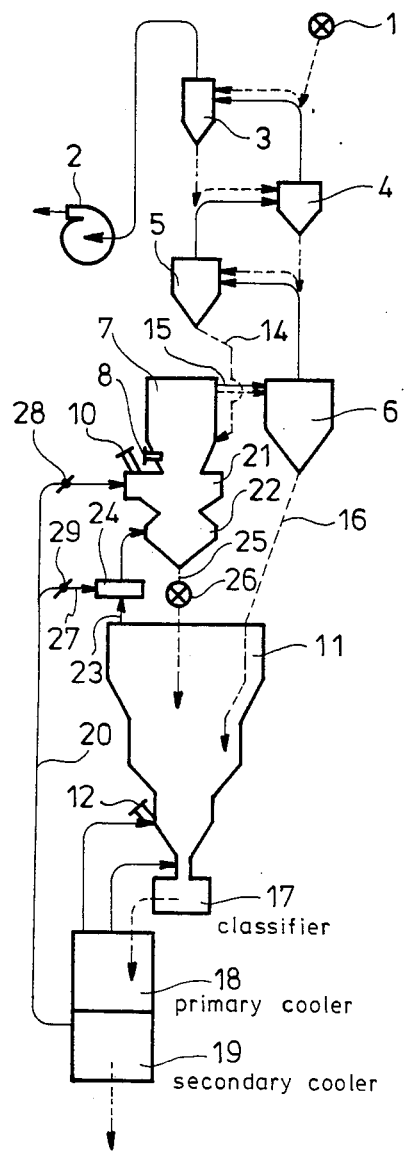
FIG. 2 is an elevational view of a cement burning installation incorporating the apparatus shown in FIG. 1.
Figure 3:
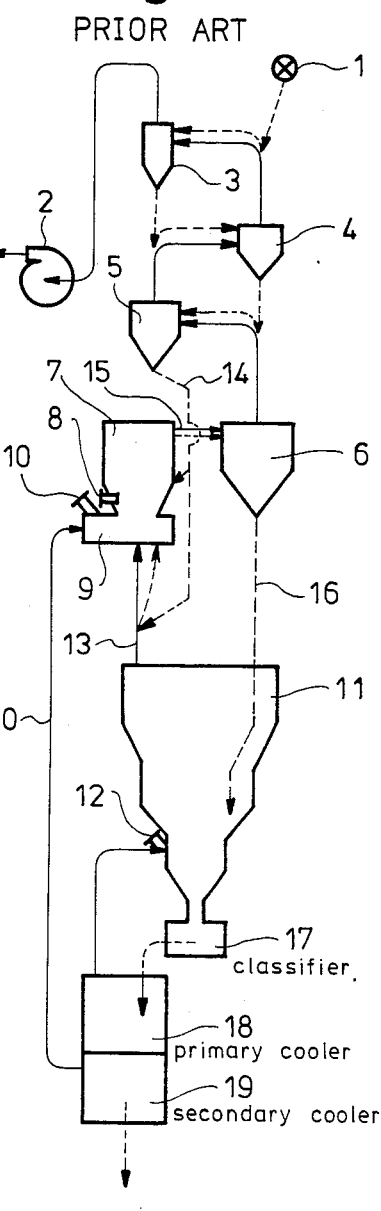
FIG. 3 is an elevational view of one example of conventional systems.

Referring to FIGS. 1 and 2, reference numeral 21 designates an upper vortex chamber which is disposed immediately below the calcining furnace 7 as in the case of the vortex chamber 9 shown in FIG. 3 and which is communicated with the secondary combustion air supply duct 20 so that the secondary combustion air is swirled in the vortex chamber 21 and is supplied to the calcining furnace 7. Reference numeral 22 designates a cyclone type lower vortex chamber which is disposed immediately below the upper vortex chamber 21 and is communicated therewith. The gas discharged out of the fluidized-bed burning furnace 11 is introduced into the lower vortex chamber 22 where the clinker particles entrained in the discharged gas are separated. Reference numeral 23 indicates a riser duct which extends upwardly from the fluidized-bed burning furnace 11, goes around the lower vortex chamber 22 and is communicated with the inlet thereof. Reference numeral 24 denotes a mixing chamber inserted into the riser duct 23 and adapted to receive part of the secondary combustion air flowing through the secondary combustion air supply duct 20 such that the introduced secondary combustion air is swirled to be mixed with the exhaust gas from the fluidized-bed burning furnace 11. Reference numeral 25 indicates a chute for returning the clinker particles separated and trapped in the lower vortex chamber 22 into the fluidized-bed burning furnace 11. Reference numeral 26 designates a seal feeder such as a rotary feeder or a weight type double damper which is inserted into the trapped clinker return chute 25. Reference numeral 27 denotes a duct branched from the secondary combustion air supply duct 20 and is communicated with the mixing chamber 24. Reference numerals 28 and 29 indicate dampers for adjusting the air flow rates, respectively. Reference numeral 30 denotes a water cooling jacket for cooling the hopper portion of the lower vortex chamber 22.

In the calcination apparatus with the above-described construction, the clinker particles which scatter in the fluidized-bed burning furnace 1 are entrained in the discharged gas from the furnace 11 so that they flow through the riser duct 23 into the lower vortex chamber 22 and are trapped therein. The trapped clinker particles are returned through the trapped clinker return chute 25 to the fluidized-bed burning furnace 11. As a consequence, scattering clinker particles do not flow into the upper vortex chamber 21 and the calcining furnace 7 so that the adverse effects caused by the scattering clinker particles in the conventional calcination apparatus can be avoided. That is, the swirling flow in the upper vortex chamber 21 is not adversely affected and no short pass of raw material occurs in the calcining furnace 7. Moreover, the combustion efficiency of the burners 8 and 10 are not adversely affected so that the calcination efficiency in the calcining furnace 7 can be improved. In addition, no draft variation results so that the collection efficiencies of the cyclones 3, 4 and 5 of the suspension preheater and the lowermost cyclone 6 are improved and that the cyclones 3, 4, 5 and 6 are prevented from being clogged. Furthermore, no circulation of the scattering clinker particles from the fluidized-bed burning furnace 11 through the calcining furnace 7, the horizontal duct 15, the lowermost cyclone 6 and the chute 16 again to the fluidized-bed burning furnace 11 will occur so that the saving in the fuel cost can be attained and the capacity of the fluidized-bed burning furnace 11 is increased. The gas from the riser duct 23 becomes the swirling gas in the lower vortex chamber 22 and then flows through the upper vortex chamber 21 into the calcining furnace 7 so that the swirling function therein is much enhanced. Part of the secondary combustion air is introduced through the branched duct 27 into the mixing chamber 24 and is mixed with the gas from the fluidized-bed burning furnace 11 so that the gas mixture temperature is lowered. Therefore, the water cooled wall portion of the riser duct 23 for preventing build-up of coating can be reduced in size. Moreover, according to the present invention, the water cooling jacket 30 is attached to the hopper wall portion of the lower vortex chamber 22 so that the build-up of coating on the hopper wall portion of the lower vortex chamber 22 can be prevented.

According to the present invention, the two vortex chambers are disposed immediately below the calcining furnace adapted to calcine the powdery raw materials and the trapped clinker return chute is interposed between the lower vortex chamber and the fluidized-bed burning furnace so that the scattering clinker particles are trapped in the lower vortex chamber and then returned into the fluidized-bed burning furnace with adavantageous result that the scattering clinker particles can be positively prevented from flowing into the upper vortex chamber and the calcining furnace. As a result, the swirling flow in the upper vortex chamber is not adversely affected and no short pass of powdery raw materials occurs in the calcining furnace so that the combustion efficiency of the burners can be prevented from being degraded. As a consequence, the calcination efficiency of the calcining furnace can be improved; no draft variation occurs; the collection efficiency of the cyclones of a preheating system is improved; and the cyclones can be prevented from being clogged. In addition, according to the present invention, the circulation of the scattering clinker particles through the calcining furnace will not occur so that the saving of the fuel cost can be attained and the capacity of the fluidized-bed burning furnace can be increased. Furthermore, the discharged gas from the fluidized-bed burning furnace is forced to swirl in the lower vortex chamber in order to separate the scattering clinker particles from the discharged gas. This swirling flow further facilitates the swirling of the gas in the calcining furnace and therefore can be effectively utilized.

What is claimed is:

1. In a calcination apparatus for use in a fluidized-bed burning installation for powdery materials comprising a fluidized-bed burning furnace, a calcining furnace for calcining the powdery materials and which is fluidically connected to the fluidized-bed burning furnace, the fluidized-bed burning furnace being subject to producing scattered clinker particles which become entrained in exhaust gas flowing from the fluidized-bed burning furnace to the calcining furnace and which can create draft variations in apparatus located upstream of the calcining furnace with respect to the direction of flow of powdery materials flowing to the calcining furnace and to the fluidized-bed burning furnace, the improvement in combination therewith which comprises: means for preventing scattered clinker particles from reaching the calcining furnace, said means comprising an upper vortex chamber disposed immediately below said calcining furnace for swirling charging secondary combustion air into said calcining furnace, means for supplying secondary combustion air into said upper vortex chamber, a cyclone type lower vortex chamber disposed immediately below said upper vortex chamber and fluidically communicated therewith, a riser duct fluidically connecting the fluidized-bed burning furnace only to said lower vortex chamber for receiving gas from the fluidized-bed burning furnace and transferring such received fluid directly and only to said lower vortex chamber, said lower vortex chamber being fluidically interposed between said fluidized-bed burning furnace and said upper vortex chamber and preventing the scattered clinker particles produced in the fluidized-bed burning furnace from reaching said upper vortex chamber and the calcining furnace, means for supplying primary air to said fluidized-bed burning furnace, and a chute connecting said lower vortex chamber to said fluidized-bed burning furnace for returning the scattered clinker particles separated and trapped in said lower vortex chamber into the fluidized-bed burning furnace.

2. The apparatus according to claim 1 wherein a hopper wall portion of said lower vortex chamber is cooled by a water cooling jacket.

3. The apparatus according to claim 1 wherein a mixing chamber for mixing part of the secondary combustion air with the gas from said fluidized-bed burning furnace is inserted into said riser duct.

4. The apparatus according to claim 2 wherein a mixing chamber for mixing part of the secondary combustion air with the gas from said fluidized-bed burning furnace is inserted into said riser duct.

* * * * *